US012630685B2

(12) United States Patent
Mielewski et al.

(10) Patent No.: US 12,630,685 B2
(45) Date of Patent: May 19, 2026

(54) MXene ENHANCED URETHANE FOAM

(71) Applicant: Ford Global Technologies, LLC, Dearborn, MI (US)

(72) Inventors: Deborah Frances Mielewski, Ann Arbor, MI (US); Alper Kiziltas, Kars (TR); Stuart C. Salter, White Lake, MI (US); Paul Kenneth Dellock, Northville, MI (US); Sandeep Tamrakar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 682 days.

(21) Appl. No.: 17/984,549

(22) Filed: Nov. 10, 2022

(65) Prior Publication Data

US 2024/0158595 A1 May 16, 2024

(51) Int. Cl.
| | |
|---|---|
| *C08J 9/00* | (2006.01) |
| *C08K 3/11* | (2018.01) |
| *C08K 3/14* | (2006.01) |

(52) U.S. Cl.
CPC ............... *C08J 9/0071* (2013.01); *C08K 3/11* (2018.01); *C08K 3/14* (2013.01); *C08J 2375/04* (2013.01)

(58) Field of Classification Search
CPC ....... C08J 2375/04; C08J 9/0071; C08K 3/11; C08K 3/14
See application file for complete search history.

(56) References Cited

U.S. PATENT DOCUMENTS

2022/0045434 A1    2/2022   Wen et al.

FOREIGN PATENT DOCUMENTS

| | | | |
|---|---|---|---|
| CN | 111286078 | 6/2020 | |
| CN | 111354575 | 6/2020 | |
| CN | 113248769 A * | 8/2021 | ............ C08J 9/0066 |
| CN | 112300363 | 3/2022 | |

OTHER PUBLICATIONS

Machine translation of CN112300363. (Year: 2022).*
Machine translation of CN-113248769-A. (Year: 2021).*
Lin et al., Highly Stable 3D Ti C T MXene-Based Foam Architectures toward High-Performance Terahertz Radiation Shielding, ACS Nano, 2020, 14, 2, 2109-2117, Jan. 17, 2020, American Chemical Society.

* cited by examiner

*Primary Examiner* — Wenwen Cai
(74) *Attorney, Agent, or Firm* — Burris Law, PLLC

(57) ABSTRACT

A foam material includes the reaction product of a polyol mixture and an isocyanate mixture, and a MXene filler in an amount up to about 0.5 wt. %. A method of forming the foam material includes adding a MXene filler in an amount up to about 0.5 wt. % into one of a polyol mixture and an isocyanate mixture, the MXene filler being in the form of layered flakes, combining the MXene filler, one of the polyol mixture and the isocyanate mixture, and a bonding enhancer to form a first liquid component into a high shear exfoliation mixer. During mixing, the MXene filler is delaminated into single layers, each of the single layers being arranged in random orientations, which is then combined with the other of the polyol mixture or the isocyanate mixture to form the foam material.

17 Claims, 3 Drawing Sheets

MXene ENHANCED URETHANE FOAM

FIELD

The present disclosure relates reinforced urethane foams and methods for producing such reinforced urethane foams.

BACKGROUND

The statements in this section merely provide background information related to the present disclosure and may not constitute prior art.

Incorporating additives into urethane foams can provide improved mechanical, thermal, and electrical properties to create multifunctional materials.

Conventional methods for manufacturing polyurethane foams typically include reacting a mixture with at least one polyol with hydroxyl groups (such as petroleum-based polyols and also referred to herein as a polyol-containing composition or polyol mixture) with at least one diisocyanate and/or polyisocyanate (also referred to herein as an isocyanate or isocyanate mixture). Additives may also be included, such as blowing agents, surfactants, catalysts, among others. The mixture of the polyol mixture, the isocyanate mixture, and any additives is also referred to as a reaction mixture or a reaction product. The polyol mixture can include additives, and the gas is formed as a result of the blowing agent, which is typically water, reacting with the isocyanates, thereby forming carbon dioxide bubbles and polyurea linkages. Other additives enhance the properties of the resulting foam, control the aforementioned reactions, and the like.

Structural reinforcements, such as graphene, have been introduced with these urethane foams in order to improve physical and mechanical properties, including for improved Noise Vibration Harshness (NVH) properties in automotive applications. Introducing structural reinforcements in urethane foams, however, can be challenging from a manufacturing standpoint, increase the cost of components manufactured from such foams, and decrease desired physical properties of the urethane foams, among others.

These issues related to the design and manufacture of structurally reinforced foams, particularly in automotive applications, are addressed by the present disclosure.

SUMMARY

This section provides a general summary of the disclosure and is not a comprehensive disclosure of its full scope or all of its features.

According to one form of the present disclosure, a foam material includes the reaction product of a polyol mixture and an isocyanate mixture having a MXene filler in an amount up to about 0.5 wt. %.

In variations of this form, which may be implemented individually or in any combination: the reaction product is a polyurethane material; a bond enhancer is configured to increase a bond strength between the MXene filler and the polyurethane material; the MXene filler is in the form of single layers of flakes, and each of the single layers are arranged in random orientations; the flakes have an average length between about 2 nm and about 500 nm; each of the flakes is about 1 nm in thickness and defines a hexagonal shape; the flakes are layered throughout the reaction product; the MXene filler includes titanium; and the MXene filler is titanium carbide $Ti_3C_2T_x$.

In another form, a foam material includes a polyurethane formed from reacting a polyol mixture and an isocyanate mixture with a MXene filler dispersed within the polyurethane in an amount up to about 0.5 wt. % and including a bond enhancer.

In variations of this form, which may be implemented individually or in any combination: the MXene filler includes titanium. In other variations, the MXene filler is titanium carbide $Ti_3C_2T_x$; the MXene filler is in the form of single flakes, and each of the single layers is arranged in random orientations; the flakes have an average length between about 2 nm and 500 nm; and a vehicle seat cushion includes the foam material.

In yet another form, a method of forming a foam material includes adding a MXene filler in an amount up to about 0.5 wt. % into one of a polyol mixture and an isocyanate mixture, and the MXene filler is in the form of layered flakes. The MXene filler and one of the polyol mixture and the isocyanate mixture are combined with bonding enhancer to form a first liquid component into a high shear exfoliation mixture. The first liquid component is mixed in the high shear exfoliation mixer such that layered flakes of the MXene filler are delaminated into single layers, and each of the single layers is arranged within the first liquid component in random orientations to form a mixed first liquid component. The mixed first liquid component is combined with the other of the polyol mixture or the isocyanate mixture, with the other of the polyol mixture or the isocyanate mixture being a second liquid component, in a process to form the foam material.

In variations of this form, which may be implemented individually or in any combination: the MXene filler is added to the polyol mixture for the first liquid component; the bonding enhancer is in an amount of about 4 wt. %; and the MXene filler comprises titanium. In other such variations, the MXene filler is titanium carbide $Ti_3C_2T_x$.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
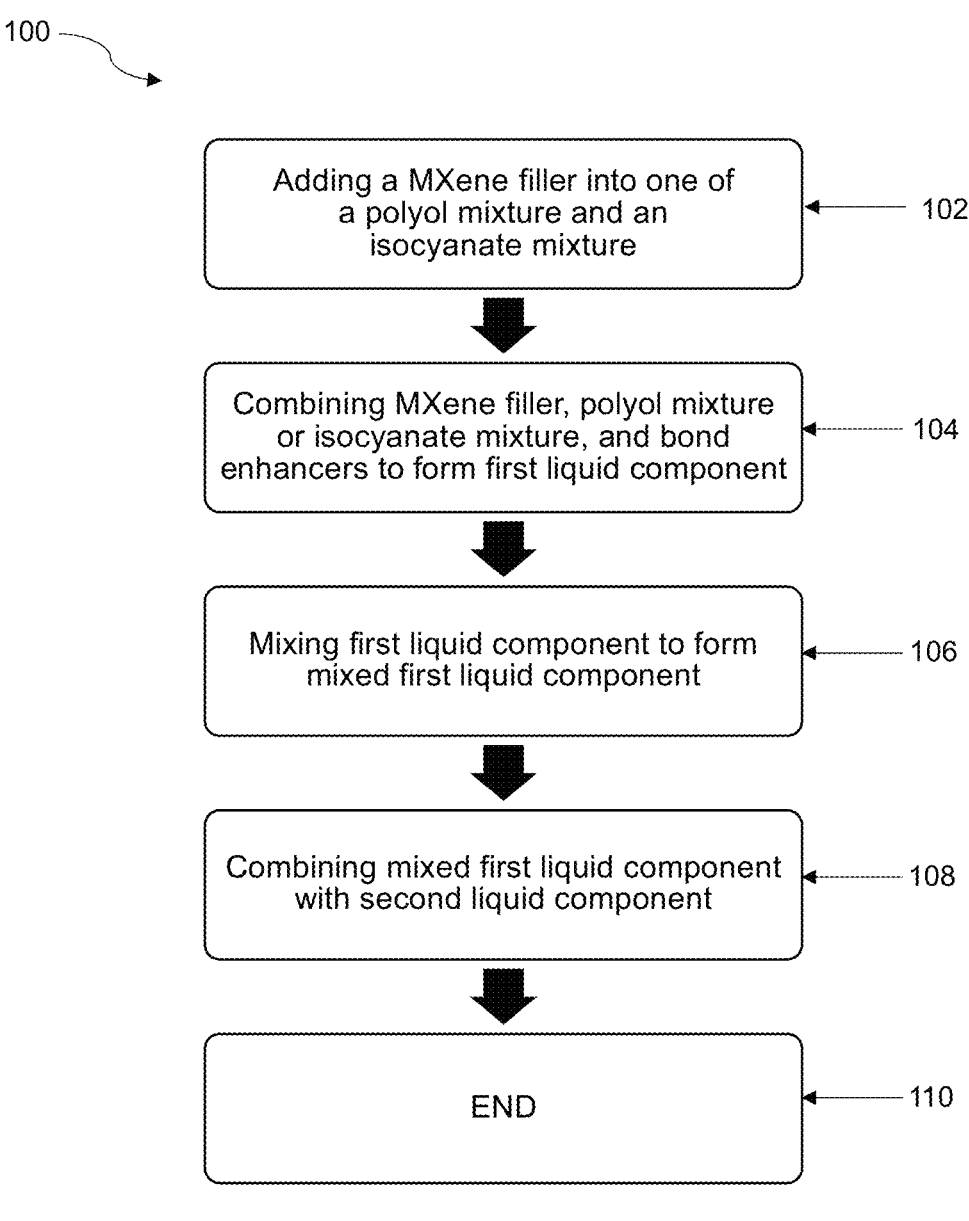
FIG. 1 is a flowchart illustrating a method for producing urethane foams according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As noted above, polyurethane foams are typically prepared by reacting isocyanates with polyols, as described in greater detail below, in the presence of additives. In such a manner, it is contemplated that a polyol mixture according to the present disclosure includes at least one of a petro-based polyol, a bio-based polyol, a $CO_2$-based polyol, mixtures thereof, and any desired additives. Such additives, some of which are optional, include at least one of a cell opener, a surfactant, a cross-linking agent, a catalyst, and a water blowing agent. According to the present disclosure, either the isocyanate solution or the polyol-containing composition includes a MXene filler and may further include a bonding enhancer to facilitate bonding of the MXene filler to the foam (e.g., the bonding enhancer is configured to increase a bond strength between the MXene filler and the polyurethane material). The foam has MXene filler dispersed therethrough in an amount of up to about 0.5 wt. %. As described in greater detail below, MXene flakes are layered throughout the foam to provide the desired mechanical and thermal properties.

As used herein, MXene fillers include MXenes (e.g., MXene particles and/or MXene flakes). More specifically, MXenes include two-dimensional inorganic compounds comprised of transition metal carbides, nitrides, and/or carbonitrides arranged in two-dimensional layers. MXenes may be formed by selectively etching out the A of MAX phases of layered, hexagonal carbides and nitrides having the general formula of $M_{n+1}AX_n$, where n=1 to 3, M is an early transition metal, A is an A-group element (e.g., Al, Si), and X is carbon and/or nitrogen. The surfaces of MXenes may be terminated by functional groups. The naming convention $M_{n+1}X_nT_x$ accordingly describes MXenes, where T is a functional group (e.g., O, F, OH, Cl). MXenes are generally characterized as having exceptional strength, thermal conductivity, and electrical conductivity. In one form of the present disclosure, the MXene filler comprises titanium. In a variation, the MXene filler comprises MXene clay, which comprises $Ti_3C_2T_x$ or $Ti_2CT_x$. When the MXene filler includes titanium, the reaction product, as well as any parts formed therefrom, exhibit antimicrobial and bactericidal characteristics, such that foams prepared according to the present disclosure alleviate the buildup of odors caused by microbes and/or bacteria.

The MXene filler in one form is hexagonal in shape, about 1 nm thick, and with lengths ranging from greater than or equal to about 2 nm to less than or equal to about 500 nm. The size of the MXene filler can be selectively tuned by varying parameters in the production process to arrive at desired lengths and thicknesses.

According to a form of the present disclosure, the MXene filler is mixed under high shear (e.g., in a high shear exfoliation mixer). MXene particles tend to be produced in stacks that are loosely attached, forming an accordion-like shape, of 1 to about 12 layers thick. High shear mixing delaminates the MXene particle stacks into single layers having random orientations with respect to one another.

The MXene fillers are hydrophilic, thereby inhibiting bonding with the reaction product and potentially reducing the mechanical properties of the foam. Bond enhancers are thus added to facilitate bond strength between the reaction product and MXene fillers to enhance mechanical properties. In a form, the bond enhancer is added in an amount of up to about 4 wt. %. In one variation, the bond enhancer is integrated into a mixture including the polyol mixture and the MXene fillers. In another form, the bond enhancer is integrated into a mixture including the isocyanate mixture and the MXene fillers.

MXene fillers, when dispersed into the reaction product of a foam produced according to the present disclosure, offer improved sound absorption and reduce the level of NVH experienced in a vehicle. Without wishing to be bound by theory, it is believed MXene fillers change the foam porosity and microstructure of foams. More specifically, the incorporation of a low amount of MXene reinforces the cell walls and struts of the foam and thus leads to a decrease of cell size and enhanced cell morphology. This in turn, results in foams with increased mechanical, thermal and physical properties.

Further, the high thermal conductivity of the MXene fillers can increase the thermal stability and insulation characteristics, making such foams ideal for under hood, headliner, and lighting applications.

As used herein, "isocyanates" include diisocyanates such as aromatic diisocyanates, toluene diisocyanates ("TDI"), and methylene diphenyl diisocyanates ("MDI"), as well as polyisocyanates, and mixtures thereof. Non-limiting examples of isocyanates include methylene diphenyl diisocyanate (MDI), toluene diisocyanate (TDI), hexamethylene diisocyanate (HDI), isophorone diisocyanate (IPDI), 4,4'-diisocyanatodicyclohexylmethane (H12MDI), 1,5-naphthalenediisocyanate (NDI), tetramethyllxylenediisocyanate (TMXDI), p-phenylenediisocyanate (PPDI), 1,4-cyclohexane diisocyanate (CDI), tolidine diisocyanate (TODI), and combinations thereof. It is contemplated isocyanates may include polymeric materials.

Polyol-containing compositions include at least one of petroleum-based polyols, bio-based polyols, and $CO_2$-polyols, as well as mixtures thereof.

As used herein, "petroleum-based polyols" (hereafter "petro-polyol") are polyether polyols which can be used in the practice of the present disclosure and are well known and widely available commercially. Such polyols are generally at least about 80% by weight or more of a composition or blend of compositions directly or indirectly obtained from a non-renewable resource such as crude oil. In other variations, the polyols are generally at least about 85% by weight, at least 90% by weight, and/or at least 95% by weight or more of a composition or blend of compositions directly or indirectly obtained from a non-renewable resource such as crude oil. Non-limiting examples of the polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and random and block copolymer glycols prepared from blends or sequential addition of two or more alkylene oxides. The mechanical properties of the resultant polyurethane foam may dictate the consistency of the polyol. More specifically, higher molecular weight polyols generally form more flexible polyurethanes, whereas lower molecular weight polyols generally form more rigid polyurethanes.

As used herein, "bio-based polyols" refer to polyols generally at least about 80% by weight or more of a composition or blend of compositions directly or indirectly obtained from a natural (e.g., animal or plant-based) oil. In other embodiments, the polyols are generally at least about 85% by weight, at least 90% by weight, and/or at least 95% by weight or more of a composition or blend of compositions directly or indirectly obtained from a natural oil. Natural oil, as used herein, includes but is not limited to vegetable oils, animal fats, algae oils tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, and castor oil. Representative non-limiting examples of animal fats include lard, tallow, poultry fat, yellow grease, and fish oil, as well as polyols made from the bio-based diols 1,3-propanediol (PDO) and 1,4-butanediol (BDO) and diacids, including succinic acid and larger acids such as Elevance's Inherent C18 octade-canedioic acid (ODDA). Representative non-limiting examples of algae oils include microalgae, such as *Nannochloropsis, Spirulina, Chlorella*; algae, such as red algae-Rhodophyta, red algae, *Pithophora oedegonia*, green algae, among others, and combinations thereof.

As used herein, carbon dioxide-based polyols are poly (ether carbonate) polyols (hereafter "$CO_2$-polyol"). Non-limiting examples of $CO_2$-polyols include CARDYON® LC-05, available from Covestro Deutschland AG.

Blowing agents assist in preparing foam, and water is highly desirable as a blowing agent. Other blowing agents suitable according to the present disclosure include fluorocarbons, hydrochlorocarbons, chorofluorocarbons, hydrofluorocarbons, hydrocarbons. It is also contemplated that gas may be added directly to the polyol isocyanate reaction mixture to form the foam.

Surfactants are useful for cell nucleation and cell opening in foam applications and offer foam stabilization. One desirable surfactant is TEGOSTAB® B 4690, available from Evonik Degussa, but it is contemplated other nonionic surfactants may be suitable for preparing the polyurethane foams disclosed herein.

Cross-linking agents may be used to improve the cross-linked network, control flexural and other properties of the foam. Suitable cross-linking agents include diethanolamine (DEA) and triethanolamine, which, when used in foam applications, build firmness and increase catalytic activity.

Catalysts enhance the processing characteristics and physical properties of polyurethane foams by promoting the basic chemical reactions between polyol and isocyanate, reactions between water and isocyanate, and reactions to trimerizate isocyanates. Catalysts may be selected according to the needs of a particular application, for example, to improve the polyether foaming process of a wide variety of foams, including high-density unfilled foam, filled foam, high load-bearing flexible foam, low-density foam, and high resilience molded foam. Other catalysts may be selected to delay the foam-forming reaction process, which can result in more open foam structures. Suitable catalysts according to the present disclosure are dibutyltin dilaurate (DBTDL) and diluted amine ethers. Tertiary amines may be desirable as catalysts when water is present in the polyol isocyanate reaction mixture, as it catalyzes the isocyanate to react with water to form urea linkages with urethane. According to a form, the catalyst may comprise a first catalyst comprised of a diluted amine ether, and a second catalyst comprised of a water-soluble tertiary amine.

Cell openers may be used to prepare foam structures that have predominantly open cells, which gives it a larger value of air permeability and include water-soluble emulsifiers.

Other optional additives include buffers, dendritic macromolecules, inorganic particulates, other types of polyols not listed herein, polyisocyanates, flame retardants, deodorants, colorants, chain extenders, fillers, combinations thereof, and other additives known to those familiar with the technology and as specific application requirements dictate.

Referring now to FIG. 1, a method 100 for producing a polyurethane foam according to the present disclosure includes adding a MXene filler in the form of layered flakes in an amount up to about 0.5 wt. % (of the resultant foam material) into one of a polyol mixture and an isocyanate mixture at 102. At 104, the MXene filler, one of the polyol mixture and the isocyanate mixture, and a bond enhancer are combined to form a first liquid component into a high shear exfoliation mixer. At 106, the first liquid component is mixed in the high shear exfoliation mixture such that layered flakes of the MXene filler are delaminated into single layers, and each of the single layers are arranged within the first liquid component in random orientations, to form a mixed first liquid component. At 108, the mixed first liquid component is combined with a second liquid component comprised of the other of the polyol mixture or the isocyanate mixture in a process to form the foam material.

Figure 2:
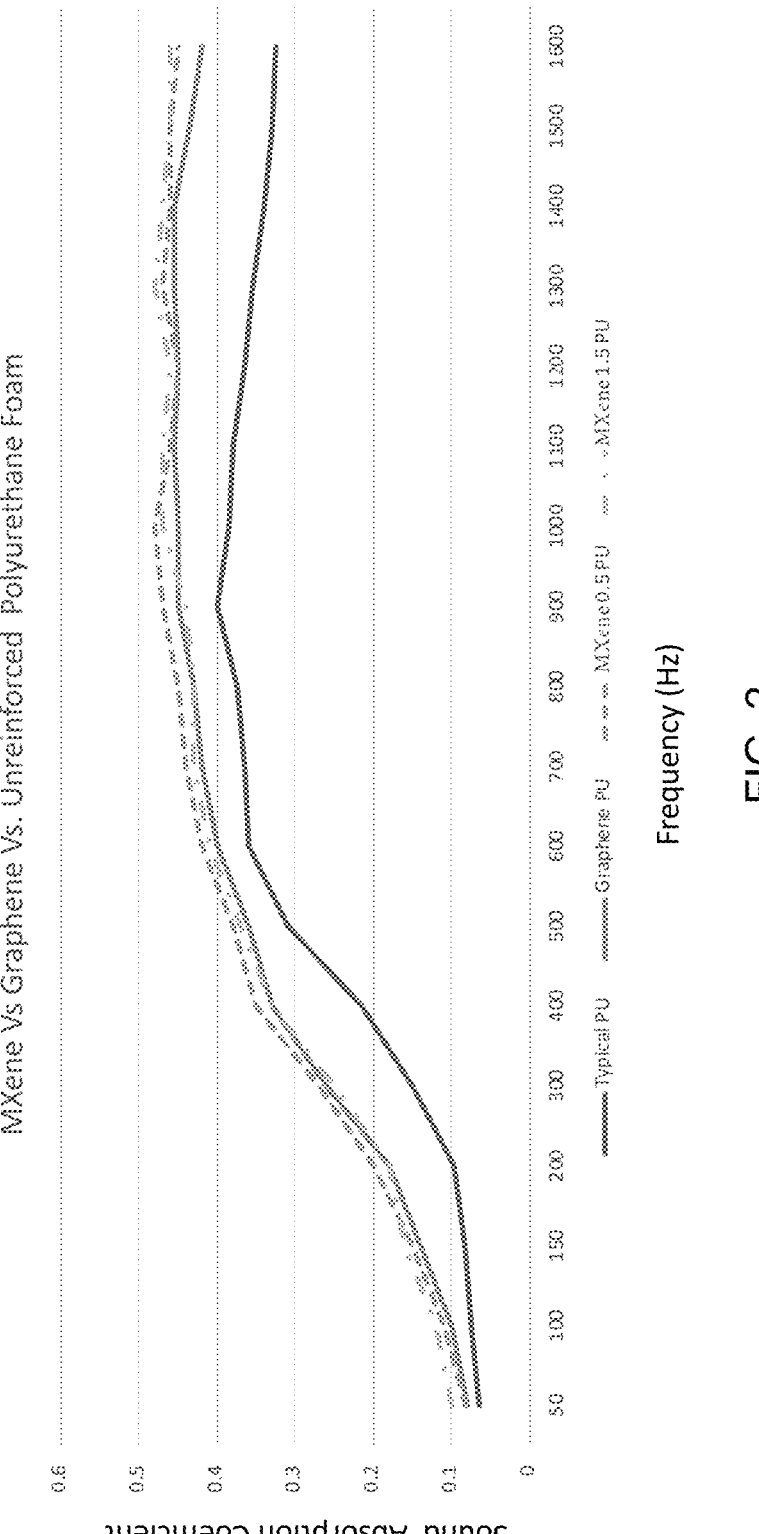
FIG. 2 is a graph showing the NVH properties of conventional polyurethane foams against the NVH properties of polyurethane foams according to the present disclosure.

Referring to FIG. 2, the MXene foams, which in this form were urethane-based, exhibited superior NVH properties compared to unreinforced urethane foam and urethane foam reinforced with graphene. As shown, smaller-sized MXene flakes (about 0.5 micrometers) performed better than larger-sized MXene flakes (about 1.5 micrometers). And MXene urethane foams exhibited superior NVH properties over conventional, unreinforced urethane foams of the same density, as can be seen from the superior sound absorption coefficient exhibited by MXene urethane foams. MXene urethane foams exhibited superior NVH properties virtually across the entire sound frequency spectrum as compared to urethane foams reinforced with similar levels of graphene.

Figure 3:
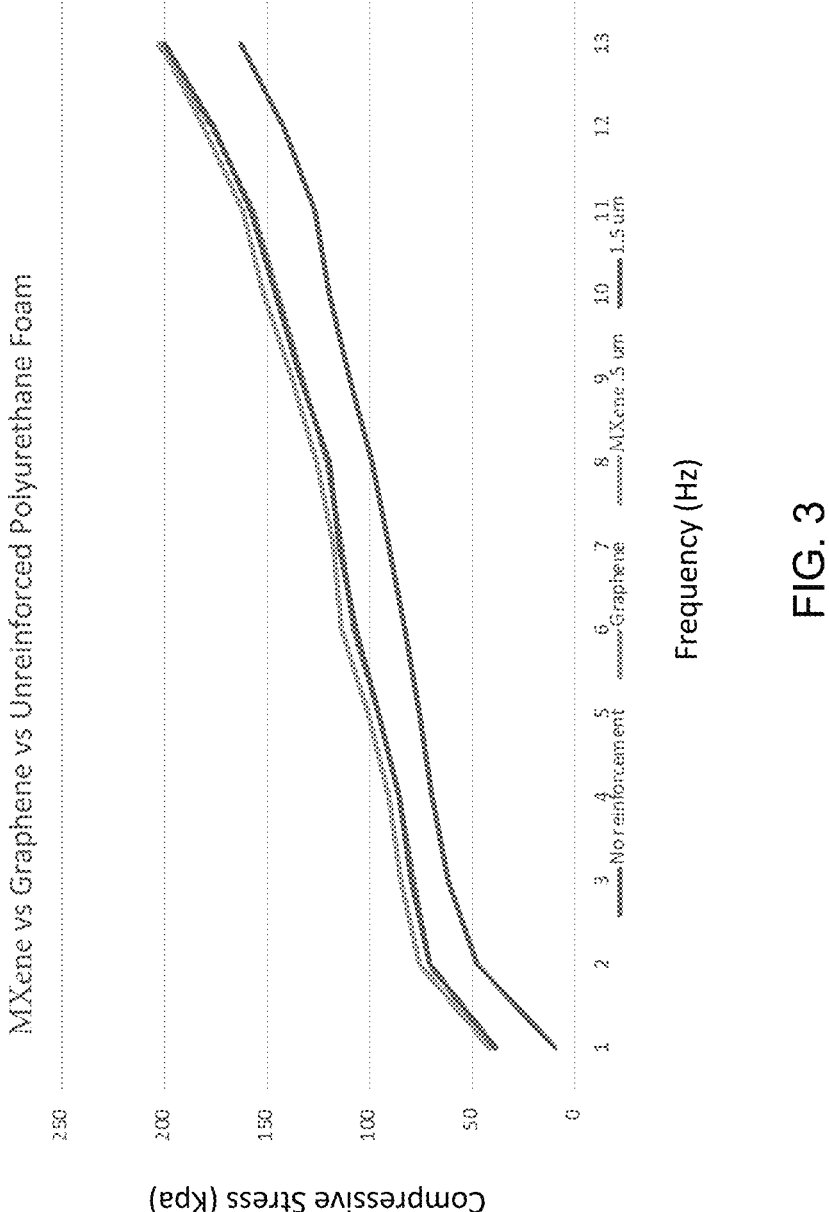
FIG. 3 is a graph showing the compressive strength of conventional polyurethane foams against the compressive strength of polyurethane foams according to the present disclosure.

And referring to FIG. 3, the MXene urethane foams exhibited superior compressive strength compared with unreinforced urethane foam and urethane foam reinforced with similar levels of graphene. Smaller-sized MXene flakes (about 0.5 micrometers) performed better than larger-sized MXene flakes (about 1.5 micrometers). And MXene urethane foams exhibited superior compressive stiffness over conventional, unreinforced urethane foams of the same density. MXene urethane foams, accordingly, can be of lower density and perform better than higher density unreinforced urethane foams. For example, as shown in FIG. 3, MXene urethane foams appear to deliver at least 20% higher compressive strength performance than unreinforced polyurethane foams. Urethane foams of larger-sized MXene flakes appeared to perform similarly to urethane foams reinforced with graphene, and urethane foams of smaller-sized MXene flakes appeared to deliver about 3% higher compressive strength performance than polyurethane foams reinforced with graphene.

The foams disclosed herein may be used in various applications where it is desirable to have foams having the superior NVH, light-weight, and high-strength properties disclosed herein, e.g., the automotive industry, including by way of example, the furniture industry, marine transportation industry. Further, the foams disclosed herein may be used in various automotive applications and for vehicle components, including but not limited to seat backs, arm rests, seat cushions, headliner applications, head rests, and NVH foams, engine covers, oil pump covers, air conditioning compression covers, fuel covers, and under the hood covers, among others.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A foam material comprising the reaction product of a polyol mixture and an isocyanate mixture; and a MXene filler in an amount up to about 0.5 wt. %, wherein the MXene filler is in the form of single layers of flakes, each of the single layers of flakes being arranged in random orientations.

2. The foam material according to claim 1, wherein the reaction product is a polyurethane material.

3. The foam material according to claim 1, wherein the flakes have an average length of about 500 nm.

4. The foam material according to claim 1, wherein the flakes have an average length between about 2 nm and about 500 nm.

5. The foam material according to claim 4, wherein each of the flakes is about 1 nm in thickness and has a hexagonal shape.

6. The foam material according to claim 1, wherein the MXene filler comprises titanium.

7. The foam material according to claim 6, wherein the MXene filler is titanium carbide $Ti_3C_2T_x$.

8. A foam material comprising:
a polyurethane formed from reacting a polyol mixture and an isocyanate mixture;
a MXene filler dispersed within the polyurethane in an amount up to about 0.5 wt. %, wherein the MXene filler is in the form of single layers of flakes, each of the single layers of flakes being arranged in random orientations; and
a bond enhancer.

9. The foam material according to claim 8, wherein the MXene filler comprises titanium.

10. The foam material according to claim 9, wherein MXene is titanium carbide $Ti_3C_2T_x$.

11. The foam material according to claim 8, wherein the flakes have an average length between about 2 nm and about 500 nm.

12. A vehicle seat cushion comprising the foam material according to claim 9.

13. A method of forming the foam material of claim 1, the method comprising:
adding a MXene filler in an amount up to about 0.5 wt. % into one of a polyol mixture and an isocyanate mixture, the MXene filler being in the form of layered flakes;
combining the MXene filler, one of the polyol mixture and the isocyanate mixture, and a bonding enhancer to form a first liquid component in a high shear exfoliation mixer;
mixing the first liquid component in the high shear exfoliation mixer such that layered flakes of the MXene filler are delaminated into single layers, each of the single layers being arranged within the first liquid component in random orientations, to form a mixed first liquid component;
combining the mixed first liquid component with the other of the polyol mixture or the isocyanate mixture to form the foam material.

14. The method according to claim 13, wherein the MXene filler is added to the polyol mixture to form the first liquid component.

15. The method according to claim 13, wherein the bonding enhancer is in an amount of about 4 wt. %.

16. The method according to claim 13, wherein the MXene filler comprises titanium.

17. The method according to claim 16, wherein the MXene filler is titanium carbide $Ti_3C_2T_x$.

* * * * *